Feb. 23, 1932.                L. J. WHITE                1,846,927
                            SPEAKING DEVICE
                    Filed Aug. 22, 1931    2 Sheets-Sheet 1
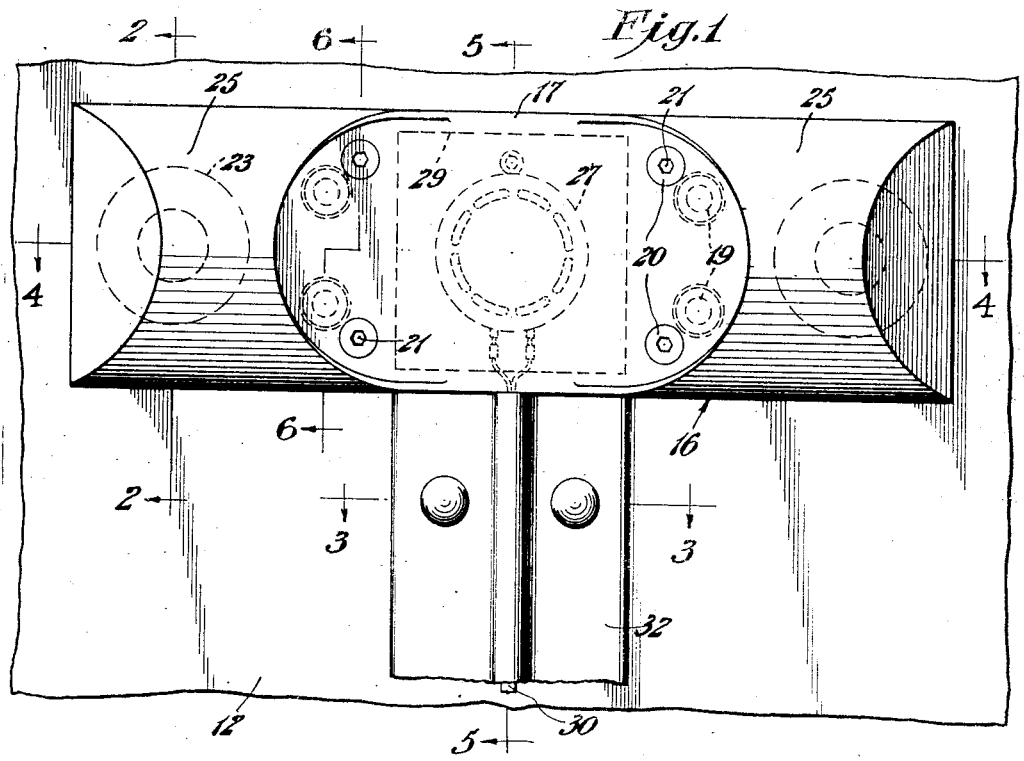
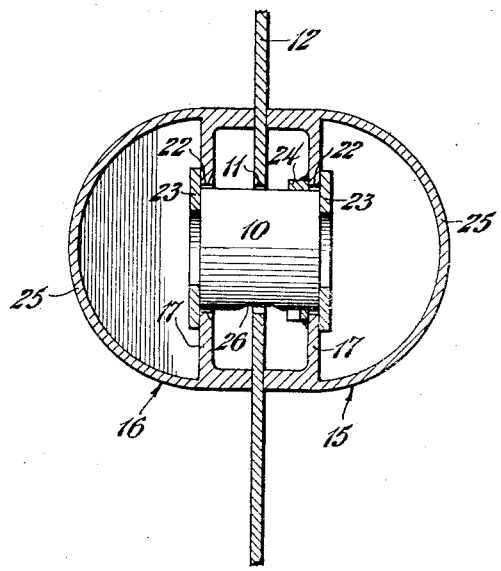
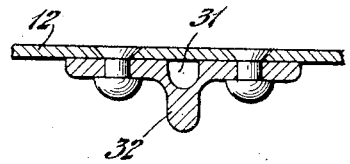
INVENTOR
L. J. White
BY Philip E. Siggers
ATTORNEY Feb. 23, 1932.   L. J. WHITE   1,846,927
SPEAKING DEVICE
Filed Aug. 22, 1931    2 Sheets-Sheet 2

INVENTOR
L. J. White
BY
ATTORNEY

Patented Feb. 23, 1932

1,846,927

UNITED STATES PATENT OFFICE

LLOYD J. WHITE, OF SAN ANTONIO, TEXAS, ASSIGNOR TO SOUTHERN PRISON COMPANY, OF SAN ANTONIO, TEXAS, A CORPORATION OF TEXAS

SPEAKING DEVICE

Application filed August 22, 1931. Serial No. 558,784.

This invention relates to speaking devices and, among other objects, aims to provide an improved speaking tube attachment for jail partitions constructed and arranged to permit a prisoner and visitor to carry on a conversation and to prevent any contraband articles or material from being passed from one to the other. Further, it aims to provide a device so constructed as to be not only highly efficient from the acoustical standpoint, but also to render it possible for an attendant to listen to the conversation between a prisoner and visitor.

In the accompanying drawings,

Fig. 1 is a side elevation of the preferred form of speaking device showing it applied to a jail wall;

Fig. 2 is a sectional view taken on the line 2—2 of Fig. 1;

Fig. 3 is a sectional view taken on the line 3—3 of Fig. 1;

Speaking devices of various kinds have been proposed to permit prisoners and visitors to converse with each other and at the same time prevent contraband articles from being passed between them. Perhaps the oldest form of communication device is a speaking tube passing through a wall. Spaced screens have heretofore been applied to speaking tubes or sound conduits and used in jails. However, in such devices, the parties conversing have to talk "at" the device rather than into it, with the result that there is little privacy. Moreover, it is difficult to carry on a whispering conversation through such devices. Further, small articles have frequently been passed between the parties. The present invention provides novel acoustical attachments for a pair of such screened tubes or conduits and means to conceal a sound transmitter or small microphone, the arrangement being such that the communicants may converse in whispers and feel assured of absolute privacy. Further, the construction is such as to make it practically impossible for a visitor to pass any contraband article through the conduits.

Figure 4:
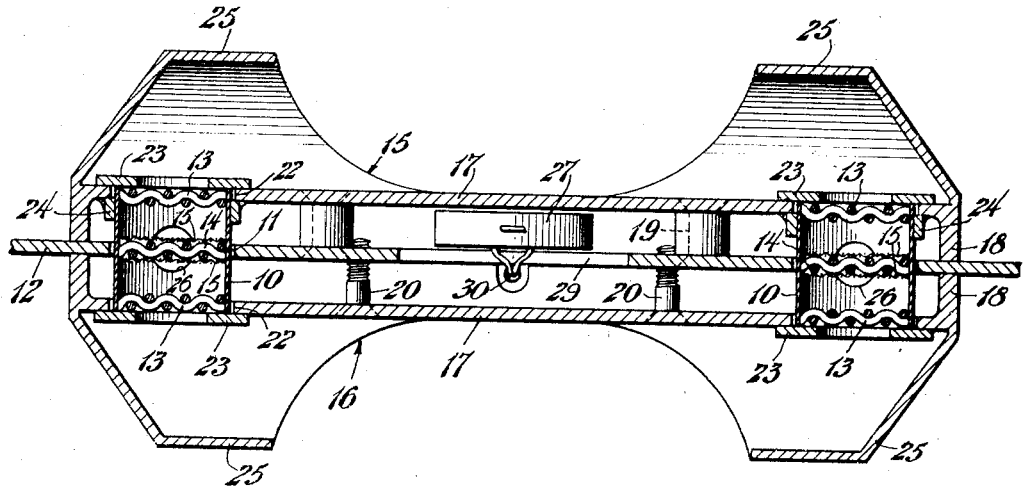
Fig. 4 is a sectional view taken on the line 4—4 of Fig. 1.
Figure 5:
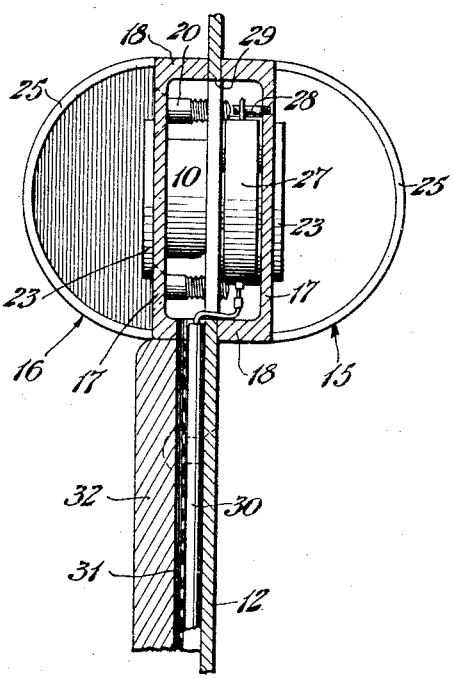
Fig. 5 is a sectional view taken on the line 5—5 of Fig. 1.
Figure 6:
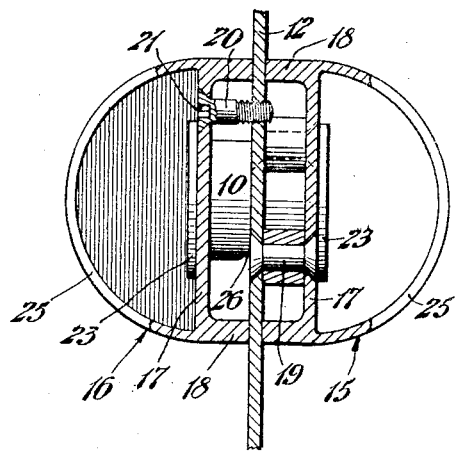
Fig. 6 is a sectional view taken on the line 6—6 of Fig. 1.

Referring particularly to the drawings, the spaced screens are there shown as being arranged in tubular elements 10 of any desired shape adapted to extend through openings 11 in a jail partition 12. The tubes 10 are shown as being spaced apart horizontally and are of sufficient length to accommodate several spaced screen members. As shown in Fig. 4, there is preferably a piece of heavy screen 13 secured within the tube at each end and another heavy screen 14 intermediate the ends. On each side of the intermediate screen 14 is a piece of fine mesh screen 15. The tubes are held in place in the wall by means of elongated retaining and acoustical members 15 and 16 secured on opposite sides of the partition and each having a rear wall 17 spaced from the jail partition 12 by a peripheral flange 18. The member 15 is preferably permanently secured on the prisoner's side of the partition by means of countersunk rivets 19 while the other member 16 is removably secured on the visitor's side by means of countersunk bolts 20 screw-threaded in the partition and having non-circular recesses 21 in their heads to receive a special tool (not shown) by means of which they may be removed.

Each member 15 and 16 has an opening 22 to receive the ends of the tubes, and secured by spot welding or the like to the outside of each wall 17 around each opening 22, is a washer 23 which abuts the adjacent end of the tube, the opening in the washers being much smaller than the inner diameter of the tubes. It will be noted that the openings 11 and 22 are larger than the tubes, the idea being to eliminate unnecessary machinery and thereby reduce production costs. Ring members 24 are welded to the inner face of the wall 17 of retaining member 15 around the openings 22, the inside diameter of the rings being substantially the same as the outside diameter of the tube. This is for the purpose of holding the tubes in fixed position while the member 16 is being placed in position. By this construction, it will be seen that a great saving of time and expense is accomplished as the washers and rings need not be centered accurately with the openings 22. After the members 15 are riveted or otherwise permanently secured to one side of a partition, the tubes are inserted from the opposite side into the rings and the member 16 may then be secured in place.

To improve the acoustics of the device and also to reduce the possibility of passing articles through it, each retaining member has a hood portion 25 at each end, the hoods being open only at their inner ends. The hoods extend over the openings in the tube so that it is impossible to see through the tubes or to pass any article directly through. Also, they protect the ends of the tubes from ordinary attack. The distance between the hood openings on each retaining member is sufficient to permit any one to place his mouth adjacent one opening and his ear adjacent the other. Thus, the hoods constitute mouth and ear pieces. In order that any articles attempted to be passed through the tubes may be retained, each tube is provided with an opening 26 in its lower portion, the opening being large enough to extend on each side of the partition, so that any article small enough to be passed through the outer screens would be deflected by the small mesh screen and fall through the opening 26 into the space between the walls 17 and the partition.

In order that the jailer may "listen in" on conversations between prisoners and visitors without their knowledge, an electrical microphone 27 is concealed behind the retaining members. While the microphone, which may be of any commercial type, could be placed between either of the retaining members and the partition, it is shown here as being hung on a supporting stud 28 secured in the rear of the wall 17 of member 15. An opening 29 is provided in the partition so that the transmitter may be placed on or removed from the stud after the member 15 has been secured to the partition. Also, the conversation may be more readily detected, as the sound waves pass through the openings 26 in both spaces formed by the partition and the members 15 and 16. The wires 30 for the transmitter may also be concealed by running it through a groove 31 cut in the rear face of a regular jail connecting batten 32 permanently secured to the partition. After passing down the groove to the floor, the wires may then be concealed in the floor and extended to the receiver (not shown).

It will be apparent that the parties may converse in relative privacy and will be unaware that any of their conversation may be heard. In fact, it has been demonstrated that, due to the hood portions, a whisper is audible through the device and as commercial microphones of the type indicated can record such sounds, valuable information may be obtained from conversations. The arrangement of the device is such that the member 16 can be removed by the jailer from the outside of the partition without the prisoner's knowledge, so that contraband articles may be removed or repairs made to the microphone, if necessary.

From the foregoing description, it will be seen that the improved speaking devices are relatively simple and easy to install in a tool proof wall or partition. In fact, the openings in the partition may be made by means of a torch.

Obviously, the present invention is not restricted to the particular embodiment thereof herein shown and described. Moreover, it is not indispensable that all the features of the invention may be used conjointly, since they may be employed advantageously in various combinations and sub-combinations.

What I claim is:—

1. In combination with a speaking device for jails and the like, an associated microphone supported therein and arranged to enable a keeper or attendant to listen in on a conversation between communicants.

2. In combination with a speaking device for jails and the like, an associated microphone supported therein and arranged to enable a keeper or attendant to listen in on a conversation between communicants; and means on the jail wall concealing the wires leading from the microphone.

3. In a speaking device for jails and the like, a partition; screened conduits passing through the partition; and acoustical members having hood-shaped mouth and ear pieces associated with the screened conduits.

4. In a speaking device for jails and the like, a partition; screened conduits passing through the partition; means secured to opposite sides of the partition to support the screened conduits; and mouth and ear pieces on said means to convey the sound to and from the said conduits.

5. In a speaking device for jails and the like, a partition; screened conduits passing through the partition; acoustical members on opposite sides of said partition each having a wall presenting openings to receive the ends of said conduits; means on one of said walls to support the conduits independently of the partition; and integral hoods on said walls over the ends of said conduits providing mouth and ear pieces and enabling communicants to converse in a whisper.

6. In a speaking device for jails and the like, a partition; screened conduits passing through the partition; acoustical members on opposite sides of said partition each having a wall presenting openings to receive the ends of said conduits; means on one of said walls to support the conduits independently of the partition; washers welded on the walls overlapping the ends of said screened conduits to secure them against endwise displacement; fine screens intermediate the ends of said conduits to intercept contraband articles; and hoods on the walls providing mouth and ear pieces for the communicants.

7. In a speaking device for jails and the like, a partition; screened conduits passing through the partition; acoustical members on opposite sides of said partition each having a wall presenting openings to receive the ends of said conduits; means on one of said walls to support the conduits independently of the partition; flanges on said walls spacing them from the partition and providing a compartment to conceal a microphone; said screened conduits having openings to permit contraband articles to lodge between the walls and to conduct sound to the microphone; and spaced mouth and ear pieces on the walls beyond the ends of the conduits.

8. In a speaking device for jails and the like, a partition; screened conduits passing through the partition; acoustical members on opposite sides of said partition each having a wall presenting openings to receive the ends of said conduits; means on one of said walls to support the conduits independently of the partition; flanges on said walls spacing them from the partition and providing a compartment to conceal a microphone; said screened conduits having openings to permit contraband articles to lodge between the walls and to conduct sound to the microphone; and spaced mouth and ear pieces on the walls beyond the ends of the conduits, one of said acoustical members being permanently secured to the inner side of the partition and the other being removably secured to the outer side of the partition.

In testimony that I claim the foregoing as my own, I have hereto affixed my signature.

L. J. WHITE.